United States Patent
Kwak et al.

(10) Patent No.: US 9,856,542 B2
(45) Date of Patent: Jan. 2, 2018

(54) FERRITIC LIGHTWEIGHT HIGH-STRENGTH STEEL SHEET HAVING EXCELLENT STIFFNESS AND DUCTILITY, AND METHOD OF MANUFACTURING THE SAME

(71) Applicant: POSCO, Pohang-si (KR)

(72) Inventors: Jai-Hyun Kwak, Gwangyang-si (KR); Kyoo-Young Lee, Gwangyang-si (KR); Kwang-Geun Chin, Gwangyang-si (KR)

(73) Assignee: POSCO, Pohang-si (KR)

( * ) Notice: Subject to any disclaimer, the term of this patent is extended or adjusted under 35 U.S.C. 154(b) by 368 days.

(21) Appl. No.: 14/421,024

(22) PCT Filed: Dec. 26, 2012

(86) PCT No.: PCT/KR2012/011473
§ 371 (c)(1),
(2) Date: Feb. 11, 2015

(87) PCT Pub. No.: WO2014/038759
PCT Pub. Date: Mar. 13, 2014

(65) Prior Publication Data
US 2015/0218668 A1    Aug. 6, 2015

(30) Foreign Application Priority Data
Sep. 4, 2012  (KR) .......... 10-2012-0097807

(51) Int. Cl.
*C22C 38/04* (2006.01)
*C22C 38/02* (2006.01)
(Continued)

(52) U.S. Cl.
CPC .......... *C21D 9/46* (2013.01); *B21B 1/26* (2013.01); *B21B 1/28* (2013.01); *B21C 47/02* (2013.01);
(Continued)

(58) Field of Classification Search
None
See application file for complete search history.

(56) References Cited

U.S. PATENT DOCUMENTS 5,278,881 A * 1/1994 Kato ............... C22C 38/38
376/150
6,387,192 B1   5/2002 Frommeyer et al.
(Continued)

FOREIGN PATENT DOCUMENTS

CN   102031027 A   12/2011
CN   102471852 A   5/2012
(Continued)

*Primary Examiner* — Deborah Yee
(74) *Attorney, Agent, or Firm* — The Webb Law Firm

(57) ABSTRACT

Provided is a ferritic lightweight high-strength steel sheet having excellent stiffness and ductility and a method of manufacturing the same. The steel sheet including 0.02 wt % to 0.1 wt % of carbon (C), 4 wt % to 15 wt % of manganese (Mn), 4 wt % to 10 wt % of aluminum (Al), 2.0 wt % or less (excluding 0) of silicon (Si), 0.01 wt % to 0.3 wt % of titanium (Ti), 0.005 wt % to 0.2 wt % of antimony (Sb), and iron (Fe) as well as unavoidable impurities as a remainder, and having a value of 0.25×Ti/C ranging from 0.17 to 1.0 and a value of Mn/Al×Log(C×Ti×10000) ranging from 1.0 to 10.

12 Claims, 2 Drawing Sheets

(51) Int. Cl.
  *C22C 38/14* (2006.01)
  *C21D 8/02* (2006.01)
  *C21D 9/46* (2006.01)
  *C21D 8/00* (2006.01)
  *C22C 38/00* (2006.01)
  *C22C 38/06* (2006.01)
  *C22C 38/60* (2006.01)
  *C23C 2/02* (2006.01)
  *C23C 2/06* (2006.01)
  *B21B 1/26* (2006.01)
  *B21B 1/28* (2006.01)
  *B21C 47/02* (2006.01)
  *B32B 15/01* (2006.01)
  *C21D 6/00* (2006.01)
  *C23C 30/00* (2006.01)

(52) U.S. Cl.
  CPC .......... *B32B 15/012* (2013.01); *B32B 15/013* (2013.01); *C21D 6/005* (2013.01); *C21D 6/008* (2013.01); *C21D 8/00* (2013.01); *C21D 8/0205* (2013.01); *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/14* (2013.01); *C22C 38/60* (2013.01); *C23C 2/02* (2013.01); *C23C 2/06* (2013.01); *C23C 30/005* (2013.01); *C21D 2211/004* (2013.01); *C21D 2211/005* (2013.01); *Y02P 10/212* (2015.11); *Y10T 428/12778* (2015.01); *Y10T 428/12972* (2015.01)

(56) References Cited

U.S. PATENT DOCUMENTS

| | | |
|---|---|---|
| 2003/0145911 A1 | 8/2003 | Hoffmann et al. |
| 2006/0179638 A1 | 8/2006 | Engl et al. |
| 2009/0297387 A1 | 12/2009 | Chin et al. |
| 2011/0017363 A1* | 1/2011 | Kang ............... C22C 38/06 148/534 |
| 2011/0083774 A1 | 4/2011 | Jin et al. |
| 2011/0318218 A1 | 12/2011 | Takada et al. |
| 2012/0037281 A1 | 2/2012 | Ono et al. |
| 2012/0180909 A1 | 7/2012 | Ono et al. |

FOREIGN PATENT DOCUMENTS

| | | |
|---|---|---|
| EP | 0889144 | 1/1999 |
| EP | 1790737 A1 | 5/2007 |
| EP | 2128293 | * 12/2009 |
| JP | 2004-521192 | 7/2004 |
| JP | 2005-015909 | 1/2005 |
| JP | 2005-273004 | 10/2005 |
| JP | 2005-325388 | 11/2005 |
| JP | 2006-118000 | 5/2006 |
| JP | 2006-176843 | 7/2006 |
| JP | 2006-176844 | 7/2006 |
| JP | 2007-321168 | 12/2007 |
| JP | 2009-287114 A | 12/2009 |
| KR | 10-2005-0084429 A | 8/2005 |
| KR | 10-2009-0123229 A | 12/2009 |
| WO | 2010/119911 A1 | 10/2010 |

* cited by examiner

[Fig. 1]
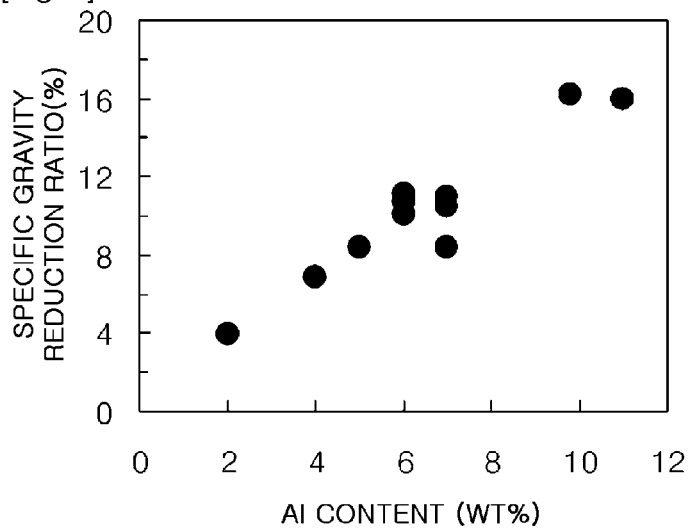
[Fig. 2]
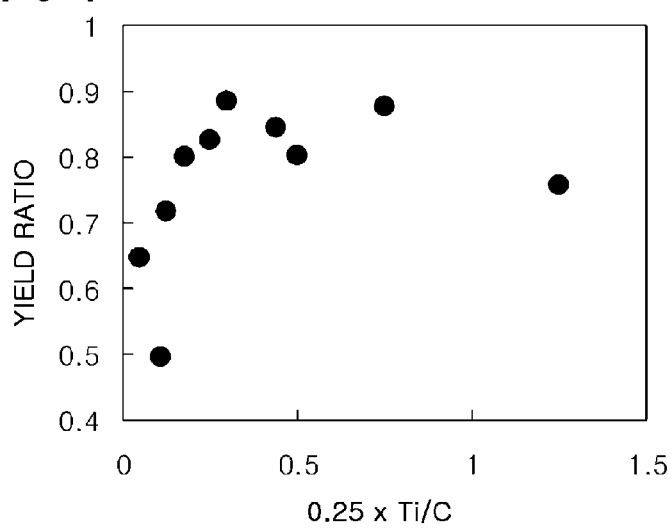
[Fig. 3]
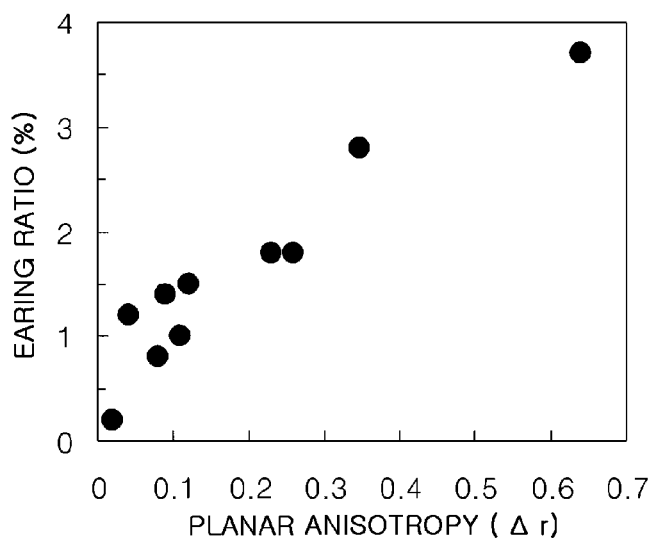

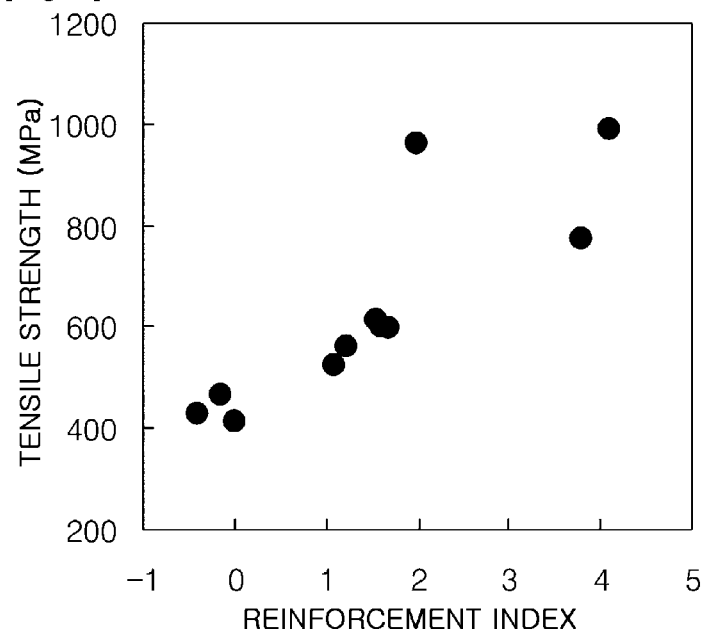

FERRITIC LIGHTWEIGHT HIGH-STRENGTH STEEL SHEET HAVING EXCELLENT STIFFNESS AND DUCTILITY, AND METHOD OF MANUFACTURING THE SAME

CROSS-REFERENCE TO RELATED APPLICATIONS

This application is the United States national phase of International Application No. PCT/KR2012/011473 filed Dec. 26, 2012, and claims priority to Korean Patent Application No. 10-2012-0097807 filed Sep. 4, 2012, the disclosures of which are hereby incorporated in their entirety by reference.

TECHNICAL FIELD

The present invention relates to a ferritic lightweight high-strength steel sheet having excellent stiffness and ductility and a method of manufacturing the same, and more particularly, to a ferritic lightweight high-strength steel sheet having excellent stiffness and ductility that may be mainly used for automotive inner and outer or structural panels, and a method of manufacturing the same.

BACKGROUND ART

Recently, with respect to steel sheets for automobiles, the strength of steels used therefor has been gradually increased as economy in automotive fuel consumption as well as passenger safety during automobile collisions are increasingly required, and simultaneously, steel sheets having a higher level of formability are required due to trends for complexity and integration in formed automotive parts. In addition, since the weight of automotive fuel systems, including batteries, is expected to greatly increase in comparison to current internal combustion engine fuel systems, according to the emergence of automobiles using new fuels replacing petroleum, there is a need to develop a lightweight material able to significantly reduce the weight of an automotive body.

Since steel has significantly better strength and ductility than of aluminum and magnesium, and production costs thereof are also relatively low, weight reduction in an automotive body is currently achieved by decreasing a thickness of a typical high-strength and high-ductility steel sheet. However, in the case that an amount of weight reduction required for future automobiles employing replacement fuels is not satisfied, the use of a non-ferrous lightweight metal, such as aluminum or magnesium, is inevitable.

Accordingly, the development of steels having a decreased specific gravity in comparison to typical steels through adding aluminum (Al), a lightweight element, to steel, has been undertaken. Such lightweight steels are typically categorized as multiphase, austenitic, and ferritic steels, and a typical technique for ferritic lightweight steel is disclosed in Japanese Patent Laid-Open Publication No. 2005-273004. The technique is for manufacturing ferritic lightweight steels by adding 2.0% to 10.0% of Al to ultra-low carbon steel, but an effect of reducing specific gravity may be low and tensile strength×elongation (TS×El) may be significantly low. Another technique is disclosed in Japanese Patent Application Laid-Open Publication No. 2006-176843. The technique is for manufacturing lightweight steels by including 0.8% to 1.2% of carbon, adding 10% to 30% of manganese (Mn) and 8% to 12% of Al, and including as low an amount of $(Fe,Mn)_3AlC$ as possible, but drawability may be low. Another technique is disclosed in Japanese Patent Application Laid-Open Publication No. 2006-149204. The technique secures stiffness and ductility through controlling texture, but tensile strength is only on the level of 400 MPa. Some steels having a tensile strength of 620 MPa are disclosed, but elongation thereof is only 25%, and 3% or more of the height of a drawn cup may be cut because of high earing in the form of mountain in the drawn cup during processing, such as drawing. Another technique is disclosed in Japanese Patent Application Laid-Open Publication No. 2003-355229. The technique is for manufacturing steels including 0.01% to 5% of carbon (C), 0.01% to 5.0% of Mn, and 3% to 10% of Al, and reduces specific gravity by the addition of a large amount of Al. However, heat treatment (including cooling) temperature and cold reduction rates may be limited after hot rolling due to the limitations of hot rolling and cold rolling cracks, and although a value of TS×El is 10,000 MPa % or more, there may be a limitations in the processing of automotive parts, because the value of TS×El may not reach a level of advanced commercial high-strength steel at 16,000 MPa %.

SUMMARY OF THE INVENTION

An aspect of the present invention provides a ferritic lightweight high-strength steel sheet having excellent stiffness and ductility by preventing a decrease in strength due to grain coarsening and a decrease in drawability due to an increase in planar anisotropy by controlling fine precipitates through the optimization of an alloy composition, and a method of manufacturing the same.

According to an aspect of the present invention, there is provided a ferritic lightweight high-strength steel sheet including: 0.02 wt % to 0.1 wt % of carbon (C); 4 wt % to 15 wt % of manganese (Mn); 4 wt % to 10 wt % of aluminum (Al); 2.0 wt % or less (excluding 0) of silicon (Si); 0.01 wt % to 0.3 wt % of titanium (Ti); 0.005 wt % to 0.2 wt % of antimony (Sb); iron (Fe) and as well as unavoidable impurities as a remainder, wherein a value of 0.25×Ti/C is in a range of 0.17 to 1.0 and a value of Mn/Al×Log(C×Ti×10000) is in a range of 1.0 to 10.

According to another aspect of the present invention, there is provided a method of manufacturing a ferritic lightweight high-strength steel sheet including: reheating a slab including 0.02 wt % to 0.1 wt % of C, 4 wt % to 15 wt % of Mn, 4 wt % to 10 wt % of Al, 2.0 wt % or less (excluding 0) of Si, 0.01 wt % to 0.3 wt % of Ti, 0.005 wt % to 0.2 wt % of Sb, and Fe as well as unavoidable impurities as a remainder, and having a value of 0.25×Ti/C ranging from 0.17 to 1.0 and a value of Mn/Al×Log(C×Ti×10000) ranging from 1.0 to 10, and then hot rolling the slab at a temperature of 850° C. or more to obtain a hot-rolled steel sheet; and coiling the hot-rolled steel sheet within a temperature range of 500° C. to 700° C.

According to the present invention, provided are a ferritic lightweight high-strength steel sheet, relatively effective in weight reduction by being able to be used as a thinner component, because specific gravity is 5% or more lower than that of a typical steel, a value of tensile strength×elongation (TS×El) is 17,000 MPa or more due to excellent tensile strength, yield strength, and ductility, and planar anisotropy is also low, and a method of manufacturing the same.

BRIEF DESCRIPTION OF DRAWINGS

FIG. 1 is a graph showing a relationship between an Al content and a specific gravity reduction ratio;

FIG. 2 is a graph showing a relationship between a value of 0.25 Ti/C and a yield ratio;

FIG. 3 is a graph showing a relationship between planar anisotropy and an earing ratio; and FIG. 4 is a graph showing a relationship between a reinforcement index and tensile strength.

DETAILED DESCRIPTION AND BEST MODE FOR CARRYING OUT THE INVENTION

Hereinafter, the present invention will be described.

First, a composition range of the present invention will be described in detail.

Carbon (C): 0.02 wt % to 0.1 wt %

C in steels refines grains through an action of dispersion strengthening by forming cementites [(Fe,Mn)$_3$C], kappa (κ) carbides [(Fe,Al)$_3$C], and fine TiC. In addition, C inhibits a preferred orientation of texture by generating random nucleation around precipitates in a recrystallization process during annealing. A content of C may be 0.02 wt % or more so as to form an appropriate level of TiC, (Fe,Mn)$_3$AlC, or κ carbides. Since cementites and κ carbides increase as the content of C increases, strength may be increased, but ductility may be decreased. In particular, in steels including aluminum (Al), brittleness may occur due to the precipitation of FeAl ordered phases and κ carbides at ferrite grain boundaries, and thus, the content of C may be 0.1 wt % or less.

Manganese (Mn): 4 wt % to 15 wt %

Mn together with C is an element controlling characteristics of carbides in the present invention and increasing strength by solid-solution strengthening. Mn coexists with C to promote high-temperature precipitation of carbides. As a result, Mn inhibits hot brittleness by preventing the formation of carbides at grain boundaries and finally contributes to improving the strength of a steel sheet. Also, since Mn decreases density by increasing a lattice constant of steel, Mn acts to decrease the specific gravity of steel. Further, in the case that a content of Mn is high, a concentration of carbon may occur due to the formation of austenite at high temperatures, and eutectoid transformation may occur or retained austenites may form during cooling to improve ductility. However, in view of the reduction of specific gravity, an austenite structure having a high packing ratio may decrease an effect of reducing specific gravity. Since the contents of C and Mn for only forming an appropriate amount of austenite at high temperatures are required, the content of Mn may be 4% or more in consideration of the foregoing. In the case that Mn is added excessively, ductility may significantly increase, but a content of Al for the reduction of specific gravity must be higher. Therefore, limitations, such as brittleness, may occur and austenites may be formed to form austenite clusters in the shape of a band in a ferrite structure. Since deformation of the austenite structure in a specific direction may be greatly increased by plastic induced transformation during deformation, planar anisotropy may significantly increase. Therefore, the content of Mn in the present invention may be 15% or less.

Aluminum (Al): 4 wt % to 10 w %

Al is one of the most important elements along with C, Mn, and titanium (Ti), and Al acts to reduce the specific gravity of steel. To obtain this effect, Al may be added in an amount of 4% or more. A large amount of Al may be added in order to stabilize the ferrite structure and reduce specific gravity, but, in this case, the ductility of steel may be significantly decreased by the formation of a large amount of intermetallic compounds, such as κ carbides, FeAl, and Fe$_3$Al. Therefore, a content of Al may be 10% or less.

Silicon (Si): 2.0 wt % or Pess (Excluding 0%)

Similar to Al, Si is effective in reducing the specific gravity of steel and inhibits the precipitation of cementites in ferrites to increase fine TiC or κ carbides. Thus, Si may increase the strength of steel. However, when a content of Si is greater than 2%, a brittle fracture may occur due to a rapid increase in an ordered phase, such as FeAl or Fe$_3$Al, in the case that the contents of C and Al are simultaneously high. Therefore, a content of Si may be 2.0% or less.

Titanium (Ti): 0.01 wt % to 0.3 wt %

Ti is a very important element in the present invention. With respect to steel including a large amount of Al, Al extends a ferrite region to stabilize ferrites even at high temperatures, in which ferrites may be recovered and recrytallized at a relatively high rate at high temperatures. Accordingly, even in the case that a hot rolling temperature is slightly decreased, coarse grains may be formed to decrease strength. In order to prevent this, fine high-temperature TiC precipitates are formed by adding Ti in an amount of 0.01% or more, and thus, grains are refined. It is well known that TiN inhibits grain growth in a high-temperature process, such as reheating of a slab. However, in the case that the content of Al is high, as in the present invention, since nitrogen preferentially forms AlN to be crystallized and float in molten steel, nitrogen in steel is almost removed when the content of Al is greater than 4%. Accordingly, Ti may not form TiN and may mostly form TiC. Since fine TiC formed during finish hot rolling may further refine grains, Ti is required in order to secure strength. Ti inhibits clustering of κ carbides during the transformation of austenite to ferrite to disperse κ carbides, and, as a result, κ carbides may be refined. Also, since precipitates, such as TiC, provide random nucleation sites to the surroundings during cold rolling, Ti may decrease planar anisotropy by preventing the formation of a preferred orientation of texture. As a result, a large amount of Ti may be added, but, in the case that Ti is added excessively, production costs may increase, and tensile strength and yield ratio may decrease because coarse precipitates may be gradually formed as precipitation temperature increases to prevent fine precipitation. Therefore, a content of Ti may be 0.3% or less.

Antimony (Sb): 0.005 wt % to 0.02 wt %

Sb acts to secure coatability of the present inventive steel and inhibit the formation of AlN and Al$_2$O$_3$ at grain boundaries at high temperatures. Since Sb exceeds a solubility limit and segregated at grain boundaries at a high temperature blocks oxygen or nitrogen diffusing through grain boundaries, Sb may not only inhibit AlN and Al$_2$O$_3$ formed at high temperatures, but may also block grain boundary segregation and diffusion paths of elements having a strong tendency of high-temperature oxidation, such as Al, Si, and Mn. Therefore, wettability between molten zinc and a base steel sheet may be improved by the inhibition of surface concentrated oxide and thus, Sb may be important for plating adhesiveness. For this purpose, Sb may be added in an amount of 0.005% or more, but, in the case that the amount of added Sb is excessive, hot ductility may decrease due to an increase in the amount of Sb existing in a molten state at grain boundaries. Therefore, a content of Sb may be 0.2% or less.

In addition to the foregoing alloying elements and composition range, a component system of the present inventive steel sheet may satisfy the following component relationships.

$0.25 \times Ti/C$: 0.17 to 1.0      [Relationship 1]

Relationship 1 represents a condition for effectively obtaining grain refinement while TiC precipitates are highly refined, and strength and yield ratio may be effectively secured through Relationship 1. Also, it is typically known that TiC precipitates do not have an effect of decreasing planar anisotropy, and rather, increase planar anisotropy. However, in the present inventive ferritic lightweight steel sheet, TiC precipitates may effectively decrease planar anisotropy and simultaneously, may secure excellent strength and yield ratio. In the case that a value of 0.25×Ti/C is less than 0.17, a yield ratio of 0.8 or more may not be secured because grain coarsening may occur and inhibition of dislocation movement by precipitates may be weak. In the case in which the value of 0.25×Ti/C is greater than 1.0, the yield ratio may rather decrease due to the coarsening of TiC precipitates and production costs may increase due to an increase in the amount of added Ti. Therefore, the value of 0.25×Ti/C in Relationship 1 may be within a range of 0.17 to 1.0.

$$Mn/Al \times Log(C \times Ti \times 10000): 1.0 \text{ to } 10 \quad [\text{Relationship 2}]$$

In addition to Relationship 1, Relationship 2 is another important parameter (hereinafter, referred to as "reinforcement index"). C and Mn as austenite-forming elements improve the strength and ductility of steel. However, in the case that the contents of C and Mn are high, a second phase decomposed from austenite may increase and, in particular, the concentration of the second phase in austenites may be promoted in steel including Al to increase a fraction of the second phase having high brittleness, such as FeAl, $Fe_3Al$, and $(Fe,Mn)_3AlC$, together with Al. Thus, hot rolling and cold rolling cracks may be formed. As a result, limitations in hot rolling and cold rolling processes may occur. In the present invention, as a result of analyzing functions of Mn, Al, C, and Ti by using various formulas, it may be confirmed that strength is proportional to a value of $Mn/Al \times Log(C \times Ti \times 10000)$, referred to as a reinforcement index. In the case that the reinforcement index is 1.0 or more, a low specific gravity lightweight steel sheet having a tensile strength of 540 MPa or more may be easily manufactured, in which cracks may not be formed and planar anisotropy may also be significantly decreased due to the grain refinement caused by TiC precipitates. However, in the case in which the contents of Mn, Ti, and C are relatively high or the content of Al is low, cracks may be easily formed during cold rolling due to the formation of $(Fe,Mn)_3C$ having a high concentration of Mn or a κ carbides cluster band structure. Therefore, the reinforcement index may be 10 or less.

The steel sheet according to the present invention is a ferritic lightweight steel sheet including a microstructure having ferrite as a main structure. The present inventive steel sheet may have a 100% ferrite microstructure in order to secure mechanical properties, such as excellent tensile strength, yield strength, and ductility, but a microstructure, such as martensite, may be inevitably formed due to a manufacturing process.

Also, in the present invention, one or more precipitates selected from the group consisting of TiC, $(Fe,Mn)_3AlC$, $(Fe,Al)_3C$, and $(Fe,Mn)_3C$ may be included and physical properties, such as grain refinement, strength, and yield ratio, may be improved through the foregoing.

The present inventive steel sheet may have an average grain diameter of 10 µm or less through the formation of the precipitates. Strength and yield ratio may be secured at an excellent level by allowing grains to be refined as above. Since a desirable effect may be manifested as the grain diameter is finer, a lower limit of the grain diameter is not particularly limited in the present invention. However, since the grain diameter may not be controlled to be less than 1 µm due to a manufacturing process, the average grain diameter may be in a range of 1 µm to 10 µm.

The steel sheet according to the present invention has a specific gravity reduction ratio of 5% or more in comparison to typical steel, such as 590DP steel or ultra-low carbon steel, generally having a specific gravity of 7.84 g/cc, and has a tensile strength of 540 MPa or more, a yield ratio of 0.8 or more, a value of tensile strength×elongation (TS×El) of 17,000 MPa % or more, and planar anisotropy of 0.3 or less. In the case that the steel sheet is used as a material for a panel due to having low specific gravity, excellent specific strength, and, in particular, excellent stiffness due to relatively high yield strength with respect to tensile strength, shape freezing properties may not only be excellent, but ductility may also be high, and thus, a typical part may be replaced with a thinner part. Therefore, an effect of weight reduction in the product may be relatively large.

Meanwhile, planar anisotropy is an index representing the difference in the degree of plastic deformation of a material in each direction. Since the difference in plastic deformation for each direction is large when planar anisotropy is high, an amount of earing in a drawn cup increases, and thus, a part to be removed may be greatly increased. Eventually, a yield of a material becomes low and residual stress in a formed product increases to cause distortion or forming defects. Therefore, a value of the planar anisotropy may be low. The planar anisotropy may be defined as below.

$$\text{Planar anisotropy } (\Delta r) = (r_0 + r_{90} - 2r_{45})/2$$

Herein, $r_0$, $r_{45}$, and $r_{90}$ are respectively Lankford (r) values in directions of 0°, 45° and 90° with respect to a rolling direction, and the r values may be obtained by measuring the difference between a width before deformation and a width after deformation of 15%.

Meanwhile, the steel sheet according to the present invention may be any one of a hot-rolled steel sheet, a cold-rolled steel sheet, and a plated steel sheet, and the plated steel sheet may include a plating layer selected from the group consisting of a zinc (Zn) based, a Zn—Fe based, a Zn—Al based, a Zn-magnesium (Mg) based, a Zn—Al—Mg based, an Al—Si based, and an Al—Mg—Si based in order to improve corrosion resistance. Also, the plating layer may have an average thickness ranging from 10 µm to 200 µm. In the case that the average thickness of the plating layer is less than 10 µm, an improvement in corrosion resistance of the base steel sheet may be insignificant, and in the case in which the average thickness of the plating layer is greater than 200 µm, the effect of the improvement in corrosion resistance may be limited, and thus, manufacturing costs may increase.

Hereinafter, a manufacturing method of the present invention will be described.

First, a slab satisfying the foregoing alloying components and composition range is reheated and the reheated slab is then hot rolled at a temperature of 850° C. or more to obtain a hot-rolled steel sheet. The reheating may be performed under typical conditions well known in the art, and, for example, may be performed at a temperature ranging from 900° C. to 1350° C. Finish hot rolling at as low a temperature as possible may be effective in obtaining fine grains and the hot rolling temperature may be 850° C. or more, an Ar3 temperature or more, for the refinement of grains. In the case that the hot rolling temperature is less than 850° C., ferrites may be formed during hot rolling to form an austenite band structure and an elongated structure may be formed due to the precipitation of κ carbides to increase planar anisotropy. Meanwhile, an upper limit of the hot rolling temperature is not particularly limited, but the hot rolling may be performed at a temperature of 1200° C. or less, because manufacturing costs may increase and grain coarsening may occur in the case that the hot rolling temperature is excessively high.

Thereafter, the hot-rolled steel sheet thus obtained may be coiled at a temperature ranging from 500° C. to 700° C. The reason for coiling at a temperature of 700° C. or less is to inhibit the coarsening and excessive precipitation of κ carbides, and prevent the formation of abnormally coarse grains due to a secondary recrystallization phenomenon of coarse grains. In the case that the coiling temperature is less than 500° C., precipitation of TiC may be insufficient, and κ carbides may not be formed, but instead a large amount of martensite may be formed. As a result, strength after annealing may not only be insufficient, but yield strength may also decrease, and thus, stiffness may not be secured.

Meanwhile, the manufacturing method of the present invention may further include cold rolling after the coiling of the hot-rolled steel sheet in order to obtain a cold-rolled steel sheet. A pickling process may be further performed in order to remove oxides formed at a high temperature, after the coiling. The cold rolling may be performed at a reduction rate ranging from 40% to 90%. In the case that the cold reduction rate is 40% or more, stored energy due to cold rolling may be secured and a new recrystallization structure may be obtained. In particular, coarse grains having an orientation between {001}<110> to {110}<110> and increasing planar anisotropy may be fractured as the cold reduction rate is higher, and may be recrystallized into {111}<110> to {111}<112> textures having the lowest planar anisotropy during a subsequent annealing process. However, in the case that the cold reduction rate is greater than 90%, since cracks may be formed at corners of the rolled sheet and {110}<110> texture known to be formed by surface shear deformation may be strongly developed due to a phenomenon of an increase in the surface area of the cold-rolled steel sheet, the cold reduction rate may be 90% or less. For example, the cold reduction rate may be in a range of 60% to 80%.

Thereafter, the cold-rolled steel sheet thus obtained may be heated to a temperature ranging from a recrytallization temperature (Tnr) to 900° C. at a rate ranging from 1° C./s to 20° C./s. In the case that the heating rate is less than 1° C./s, productivity may decrease, and grain coarsening and a decrease in strength may occur due to prolonged exposure to high temperatures, and thus, a material may degrade. In the case in which the heating rate is greater than 20° C./s, ductility may decrease due to insufficient recrystallization. In the case that the heating stop temperature is less than the recrystallization temperature, ductility may not be secured because a work hardening structure may remain, and in the case in which the heating stop temperature is greater than 900° C., ductility may increase due to the formation of coarse grains, but strength may decrease due to the re-dissolution of carbides.

Continuously, the cold-rolled steel sheet may be annealed in the heating stop temperature range for 10 seconds to 180 seconds. The annealing process is to sufficiently develop {111} textures that may be effective in decreasing planar anisotropy, and, for this purpose, the annealing time may be 10 seconds or more. However, in the case that the annealing time is greater than 180 seconds, productivity may significantly decrease, and corrosion resistance and surface properties may deteriorate due to an increase in time for hot-dip galvanizing or alloying treatment.

Meanwhile, the annealed cold-rolled steel sheet may be subjected to cooling and overaging treatments as needed, and the cooling and the overaging treatments may be performed by using methods well known in the art. For example, the annealed cold-rolled steel sheet is cooled to a temperature ranging from 200° C. to 500° C. at a rate raging from 1° C./s to 100° C./s, and is then subjected to an isothermal heat treatment.

Meanwhile, in the present invention, a plating process may be further performed with respect to the cold-rolled steel sheet thus obtained, and corrosion resistance of the steel sheet may be improved therethrough.

Hereinafter, the present invention will be described in detail, according to the following examples. However, the following examples are merely presented to exemplify the present invention, and the scope of the present invention is not limited thereto.

MODE FOR THE INVENTION

Steel slabs having alloy compositions described in the following Table 1 were manufactured by vacuum induction melting, and were then heated at a temperature of 1200° C. and removed from a furnace. As described in Table 2 below, hot rolling was completed at a temperature ranging from 860° C. to 930° C. to obtain 3.0 mm to 3.5 mm thick hot-rolled steel sheets. The hot-rolled steel sheets thus manufactured were coiled at a temperature ranging from 350° C. to 720° C., maintained for 1 hour, and then furnace cooled to room temperature. Then, scale was removed through acid cleaning and cold rolling was performed to obtain 0.7 mm to 1.0 mm thick cold-rolled steel sheets. Thereafter, annealing was performed under annealing conditions presented in the following Table 2 by heating the cold-rolled steel sheets at a rate of 5° C./s, and the cold-rolled steel sheets were rapidly cooled to 400° C. at a rate of 20° C./s and final cold-rolled steel sheets were manufactured by air cooling the cold-rolled steel sheets to room temperature after an isothermal heat treatment for 100 seconds. Mechanical properties for the cold-rolled steel sheets thus manufactured were measured and the results thereof are presented in Table 3 below. At this time, specific gravity was measured in such a manner that a steel sheet having a size of 100 mm×100 mm was prepared, the weight thereof was measured at room temperature, the steel sheet was suspended by a 0.05 mm thick wire to be immersed in a beaker containing water at room temperature, and the weight thereof was then measured. At this time, the specific gravity of water was 1 g/cc and specific gravity of steel as a reference of specific gravity reduction ratio was 7.84 g/cc. An earing ratio was measured in such a manner that a steel sheet was manufactured to have a circular shape having a diameter of 95 mm, drawing was performed to have a drawing ratio of 1.9 by using a punch having a diameter of 50 mm, a maximum height (protrusion height of the cup) and a minimum height (valley depth of the cup) of a cup thus prepared were measured, and the earing ratio was then calculated by using an equation, (the maximum height the minimum height)/the maximum height. The steel sheet was elongated by an amount of 15%, and planar anisotropy was obtained through data measured for changes in the width thereof before and after the elongation. In the case of Comparative Example 5, the result obtained after elongation of 10% was described.

TABLE 1

| Category | Chemical Composition (wt %) | | | | | | | | Relationship 1 | Relationship 2 |
|---|---|---|---|---|---|---|---|---|---|---|
| | C | Mn | Al | Si | Ti | Sb | Ca | B | | |
| Inventive Steel 1 | 0.05 | 8 | 7 | 1 | 0.05 | 0.08 | 0.01 | 0.002 | 0.25 | 1.6 |
| Inventive Steel 2 | 0.1 | 15 | 9.8 | 1.8 | 0.3 | 0.14 | 0.02 | 0.0015 | 0.75 | 3.79 |
| Inventive Steel 3 | 0.07 | 6 | 6 | 1.5 | 0.05 | 0.025 | 0.002 | 0.003 | 0.18 | 1.54 |
| Inventive Steel 4 | 0.04 | 7 | 6 | 1 | 0.07 | 0.04 | 0.003 | 0.002 | 0.44 | 1.69 |
| Inventive Steel 5 | 0.025 | 7 | 5 | 1 | 0.03 | 0.024 | 0.001 | 0.001 | 0.3 | 1.23 |
| Comparative Steel 1 | 0.002 | 4 | 7 | 1.2 | 0.01 | 0.03 | 0.006 | — | 1.25 | −0.4 |
| Comparative Steel 2 | 0.07 | 3 | 2 | 1 | 0.03 | 0.025 | 0.001 | — | 0.11 | 1.98 |
| Comparative Steel 3 | 0.2 | 4 | 7 | 1.2 | 0.04 | 0.01 | 0.01 | 0.006 | 0.05 | 1.09 |
| Comparative Steel 4 | 0.3 | 17 | 11 | 1.5 | 0.15 | 0.24 | 0.025 | — | 0.13 | 4.1 |
| Comparative Steel 5 | 0.07 | 6 | 6 | 2.5 | 0.06 | 0.025 | 0.005 | — | 0.21 | 1.62 |
| Comparative Steel 6 | 0.006 | 4 | 4 | 0.65 | 0.012 | 0.006 | 0.003 | 0.001 | 0.5 | −0.14 |
| Comparative Steel 7 | 0.011 | 0.1 | 9.2 | 0.09 | 0.05 | — | — | 0.001 | 1.14 | 0.01 |

Relationship 1 = 0.25 × Ti/C
Relationship 2 = Mn/Al × Log(C × Ti × 10000)

TABLE 2

| Steel No. | Category | Hot rolling temperature (° C.) | Coiling temperature (° C.) | Cold reduction rate (%) | Annealing temperature (° C.) | Annealing time (seconds) |
|---|---|---|---|---|---|---|
| Inventive Steel 1 | Inventive Example 1 | 860 | 670 | 79.4 | 800 | 35 |
| Inventive Steel 2 | Inventive Example 2 | 930 | 550 | 67.7 | 830 | 35 |
| Inventive Steel 3 | Inventive Example 3 | 880 | 570 | 71.9 | 870 | 60 |
| Inventive Steel 4 | Inventive Example 4 | 915 | 620 | 70.6 | 850 | 35 |
| Inventive Steel 5 | Inventive Example 5 | 870 | 520 | 80.0 | 780 | 40 |
| Inventive Steel 1 | Comparative Example 1 | 860 | 320 | 79.4 | 830 | 35 |
| Inventive Steel 1 | Comparative Example 2 | 860 | 670 | 79.4 | 920 | 35 |
| Inventive Steel 2 | Comparative Example 3 | 930 | 550 | 67.7 | 780 | 9 |
| Comparative Steel 1 | Comparative Example 4 | 925 | 630 | 79.4 | 830 | 35 |
| Comparative Steel 2 | Comparative Example 5 | 870 | 620 | 66.7 | 830 | 35 |
| Comparative Steel 3 | Comparative Example 6 | 865 | 630 | 75.0 | 800 | 35 |
| Comparative Steel 4 | Comparative Example 7 | 880 | 630 | 68.8 | 830 | 35 |
| Comparative Steel 5 | Comparative Example 8 | 895 | 630 | — | — | — |
| Comparative Steel 6 | Comparative Example 9 | 930 | 630 | 79.4 | 820 | 20 |
| Comparative Steel 7 | Comparative Example 10 | 880 | 600 | 75.8 | 850 | 30 |

TABLE 3

| Category | Yield strength (YS) (MPa) | Tensile strength (TS) (MPa) | Elongation (El) (%) | Yield ratio | TS × El (MPa %) | Planar anisotropy | Specific gravity (g/cc) | Specific gravity reduction ratio (%) | Earing ratio (%) | Presence of cold cracks |
|---|---|---|---|---|---|---|---|---|---|---|
| Inventive Example 1 | 495.9 | 600.3 | 31 | 0.83 | 18609.3 | 0.08 | 6.98 | 11.0 | 0.8 | X |
| Inventive Example 2 | 678.2 | 774.3 | 24.2 | 0.88 | 18738.1 | 0.26 | 6.57 | 16.2 | 1.8 | X |
| Inventive Example 3 | 492 | 614.8 | 28.3 | 0.80 | 17398.8 | 0.11 | 7 | 10.7 | 1 | X |
| Inventive Example 4 | 504.2 | 596.7 | 29.2 | 0.84 | 17423.6 | 0.09 | 7.05 | 10.1 | 1.4 | X |
| Inventive Example 5 | 497.7 | 562.3 | 32.4 | 0.89 | 18218.5 | 0.02 | 7.18 | 8.4 | 0.2 | X |
| Comparative Example 1 | 280.2 | 433.8 | 39.6 | 0.65 | 17178.5 | 0.16 | 6.98 | 11.0 | 1.6 | X |

TABLE 3-continued

| Category | Yield strength (YS) (MPa) | Tensile strength (TS) (MPa) | Elongation (El) (%) | Yield ratio | TS × El (MPa %) | Planar anisotropy | Specific gravity (g/cc) | Specific gravity reduction ratio (%) | Earing ratio (%) | Presence of cold cracks |
|---|---|---|---|---|---|---|---|---|---|---|
| Comparative Example 2 | 287.4 | 385.5 | 41.4 | 0.75 | 15959.7 | 0.11 | 6.98 | 11.0 | 1.6 | X |
| Comparative Example 3 | 892 | 970 | 7.1 | 0.92 | 6887 | — | 6.57 | 16.2 | — | X |
| Comparative Example 4 | 324.6 | 428.4 | 41 | 0.76 | 17565.4 | 0.35 | 7.02 | 10.5 | 2.8 | X |
| Comparative Example 5 | 478.3 | 963.1 | 14.7 | 0.50 | 14157.6 | 0.12 | 7.53 | 4.0 | — | X |
| Comparative Example 6 | 339.5 | 525.4 | 37.5 | 0.65 | 19702.5 | 0.64 | 7.18 | 8.4 | 3.7 | ○ |
| Comparative Example 7 | 711 | 990.3 | 36.2 | 0.72 | 35848.9 | 0.04 | 6.59 | 15.9 | 1.2 | ○ |
| Comparative Example 8 | — | — | — | — | — | — | 6.97 | 11.1 | — | ● |
| Comparative Example 9 | 372.9 | 465.4 | 37.7 | 0.79 | 17545.6 | 0.23 | 7.3 | 6.9 | 1.8 | X |
| Comparative Example 10 | 312.2 | 413.7 | 35.6 | 0.76 | 14727.7 | 0.36 | 6.97 | 11.1 | 2.7 | ○ |

As shown in Tables 1 to 3, with respect to Inventive Examples 1 to 5 satisfying alloying components, composition range, and manufacturing conditions suggested in the present invention, it may be understood that values of TS×El are 17,000 MPA % or more, because both tensile strengths and ductilities are excellent. Also, since specific gravities were 5% or more lower than those of typical steel, it may be understood that weight reduction of the products may be effectively achieved. In particular, it may be understood that stiffnesses were also quite excellent as yield ratios were 0.8 or more and actual yield of the products may be improved as the earing ratios were within 2%.

In contrast, when Comparative Examples 1 to 3 satisfying the component system suggested in the present invention but not satisfying manufacturing conditions were examined, the precipitation of TiC and carbides were insufficient with respect to Comparative Example 1, because the coiling temperature conditions were not satisfied. Thus, it may be understood that a yield ratio was low and strength was also low, because grain growth was not prevented. With respect to Comparative Example 2, although fine precipitates were sufficiently dispersed by coiling in an appropriate temperature range, grain growth occurred due to a high annealing temperature, and thus, it may be understood that a yield ratio was relatively low and tensile strength was significantly decreased. With respect to Comparative Example 3, since recrystallization was not completed due to insufficient annealing time, a rolling structure remained as it is, and thus, it may be understood that elongation was at a considerably low level. Since drawing was not possible due to such low elongation, an earing ratio was unable to be measured, and since the steel sheet was fractured during the elongation thereof for measuring planar anisotropy, the planar anisotropy was also unable to be measured.

Meanwhile, Comparative Examples 4 to 10 employed steels not satisfying the component system suggested in the present invention, in which it may be understood that strengths or elongations were low, or earing ratios were high. Also, with respect to Comparative Example 5, since drawing was not possible due to low elongation, an earing ratio was unable to be measured. With respect to Comparative Examples 8 to 10 and 12, it may be understood that cracks were formed at corners of the steel sheets during cold rolling. In particular, with respect to Comparative Example 8, even a cold-rolled sample may not be manufactured, because the steel sheet was fractured at an initial stage of rolling.

A graph showing the relationship between an Al content and a specific gravity reduction ratio is presented in FIG. 1 based on the foregoing results. As shown in FIG. 1, it may be understood that Al must be included in an amount of 4% or more in order to obtain an excellent specific gravity reduction ratio of 5% or more.

FIG. 2 is a graph showing a relationship between a value of 0.25×Ti/C and a yield ratio. As shown in FIG. 2, it may be understood that fine TiC precipitates were sufficiently dispersed when the value of 0.25×Ti/C was 0.17 or more and, as a result, a yield ratio of 0.8 or more could be obtained. However, in the case that the value of 0.25×Ti/C was greater than 1, it may be understood that a precipitation strengthening effect rather disappeared due to coarse TiC precipitates.

FIG. 3 is a graph showing a relationship between planar anisotropy and an earing ratio. As shown in FIG. 3, in the case that the planar anisotropy was 0.3 or less, it may be understood that the earing ratio was minimized in which the earing ratio was 2% or less. However, in the case that the earing ratio was greater than 0.3, it may be understood that the earing ratio increased and, as a result, yield of the product may be decreased.

FIG. 4 is a graph showing a relationship between a reinforcement index and tensile strength. As shown in FIG. 4, it may be understood that the reinforcement index expressed by Mn/Al×Log(C×Ti×10000) was proportional to tensile strength. In the case that the reinforcement index was 1.0 or more, it may be understood that a lightweight steel sheet having a tensile strength of 540 MPa or more may be manufactured, in which cracks may not be formed and planar anisotropy may also be minimized due to the grain refinement caused by TiC precipitates.

The invention claimed is:

1. A ferritic lightweight high-strength steel sheet comprising:
0.02 wt % to 0.1 wt % of carbon (C);
4 wt % to 15 wt % of manganese (Mn);
4 wt % to 10 wt % of aluminum (Al);
2.0 wt % or less (excluding 0) of silicon (Si);
0.01 wt % to 0.3 wt % of titanium (Ti);

0.005 wt % to 0.2 wt % of antimony (Sb); and iron (Fe) as well as unavoidable impurities as a remainder, wherein a value of 0.25×Ti/C is in a range of 0.17 to 1.0 and a value of Mn/Al×Log(C×Ti×10000) is in a range of 1.0 to 10.

2. The ferritic lightweight high-strength steel sheet of claim 1, wherein the steel sheet comprises one or more precipitates selected from the group consisting of TiC, $(Fe,Mn)_3AlC$, $(Fe,Al)_3C$, and $(Fe,Mn)_3C$.

3. The ferritic lightweight high-strength steel sheet of claim 1, wherein an average diameter of grains in the steel sheet is 10 μm or less.

4. The ferritic lightweight high-strength steel sheet of claim 1, wherein the steel sheet has a specific gravity of 7.2 g/cc or less, a tensile strength of 540 MPa or more, a yield ratio of 0.8 or more, a value of tensile strength×elongation (TS×El) of 17,000 MPa % or more, and an planar anisotropy of 0.3 or less.

5. The ferritic lightweight high-strength steel sheet of claim 1, wherein the steel sheet is any one of a hot-rolled steel sheet, a cold-rolled steel sheet, and a plated steel sheet.

6. The ferritic lightweight high-strength steel sheet of claim 5, wherein the plated steel sheet comprises a plating layer selected from the group consisting of a zinc (Zn) based, a Zn—Fe based, a Zn—Al based, a Zn-magnesium (Mg) based, a Zn—Al—Mg based, an Al—Si based, and an Al—Mg—Si based.

7. The ferritic lightweight high-strength steel sheet of claim 5, wherein the plated steel sheet comprises a plating layer having an average thickness ranging from 10 μm to 200 μm.

8. A method of manufacturing a ferritic lightweight high-strength steel sheet, the method comprising:

reheating a slab including 0.02 wt % to 0.1 wt % of C, 4 wt % to 15 wt % of Mn, 4 wt % to 10 wt % of Al, 2.0 wt % or less (excluding 0) of Si, 0.01 wt % to 0.3 wt % of Ti, 0.005 wt % to 0.2 wt % of Sb, and Fe as well as unavoidable impurities as a remainder, and having a value of 0.25×Ti/C ranging from 0.17 to 1.0 and a value of Mn/Al×Log(C×Ti×10000) ranging from 1.0 to 10, and then hot rolling the slab at a temperature of 850° C. or more to obtain a hot-rolled steel sheet; and coiling the hot-rolled steel sheet within a temperature range of 500° C. to 700° C.

9. The method of claim 8, further comprising:

cold rolling the hot-rolled steel sheet to obtain a cold-rolled steel sheet, after the coiling of the hot-rolled steel sheet;

heating the cold-rolled steel sheet to a temperature ranging from Tnr to 900° C. at a rate ranging from 1° C./s to 20° C./s, where Tnr is a recrystallization temperature; and annealing the heated cold-rolled steel sheet for 10 seconds to 180 seconds.

10. The method of claim 9, wherein the cold rolling is performed at a reduction rate ranging from 40% to 90%.

11. The method of claim 9, further comprising performing an isothermal heat treatment after cooling the cold-rolled steel sheet to a temperature ranging from 200° C. to 500° C. at a rate ranging from 1° C./s to 100° C./s, after the annealing.

12. The method of claim 9, further comprising plating the cold-rolled steel sheet, after the annealing.

* * * * *